(12) United States Patent
Chiu

(10) Patent No.: US 11,048,214 B2
(45) Date of Patent: Jun. 29, 2021

(54) WRISTWATCH AND METHOD APPLICABLE TO WRISTWATCH FOR CONTROLLING MAGNITUDE OF SHORT DISTANCE COMMUNICATION SIGNALS

(71) Applicant: PRINCO CORP., Hsinchu (TW)

(72) Inventor: Pei-liang Chiu, Hsinchu (TW)

(73) Assignee: PRINCO CORP., Hsinchu (TW)

( * ) Notice: Subject to any disclaimer, the term of this patent is extended or adjusted under 35 U.S.C. 154(b) by 395 days.

(21) Appl. No.: 15/897,382

(22) Filed: Feb. 15, 2018

(65) Prior Publication Data

US 2019/0101871 A1 Apr. 4, 2019

(30) Foreign Application Priority Data

Sep. 29, 2017 (TW) .................. 106133795

(51) Int. Cl.
*G04R 60/12* (2013.01)
*H04B 5/00* (2006.01)
*H04W 4/80* (2018.01)
*G04G 17/04* (2006.01)
*G04G 21/04* (2013.01)
(Continued)

(52) U.S. Cl.
CPC ............. *G04R 60/12* (2013.01); *G04G 17/04* (2013.01); *G04G 21/04* (2013.01); *H04B 5/0031* (2013.01); *H04W 4/80* (2018.02); *G04G 21/08* (2013.01); *G06F 3/041* (2013.01)

(58) Field of Classification Search
CPC ......... G04G 17/04; G04G 21/04; G04R 60/12
See application file for complete search history.

(56) References Cited

U.S. PATENT DOCUMENTS

| 5,796,827 | A | 8/1998 | Coppersmith et al. |
| 8,836,868 | B2 | 9/2014 | Sasaki |
| 8,872,789 | B2 | 10/2014 | Lee |

(Continued)

FOREIGN PATENT DOCUMENTS

| CN | 1185065 A | 6/1998 |
| CN | 1801009 A | 7/2006 |

(Continued)

OTHER PUBLICATIONS

Machine Translation of JP 2006/030211 (Year: 2006).*

*Primary Examiner* — Edwin A. Leon
*Assistant Examiner* — Jason M Collins
(74) *Attorney, Agent, or Firm* — Hauptman Ham, LLP

(57) ABSTRACT

A wristwatch and a method applicable to a wristwatch for controlling the magnitude of short distance communication signals are provided. A short distance communication module is disposed inside the wristwatch, and therefore short distance communication is carried out in the wristwatch. Also, an amplifier is deployed in the wristwatch, thereby carrying out enhancing the magnitude of the short distance communication signals. The magnitude of the short distance communication signals can also increase or decrease through user operations. In another aspect, a magnetic field isolating layer is disposed inside a housing of the wristwatch. The magnetic field isolating layer can reduce interference caused by the housing or other components of the wristwatch, and thus can enhance the magnitude of the short distance communication signals and extend the sensing distance.

8 Claims, 9 Drawing Sheets

(51) Int. Cl.
*G04G 21/08* (2010.01)
*G06F 3/041* (2006.01)

(56) References Cited

U.S. PATENT DOCUMENTS

| | | |
|---|---|---|
| 8,902,716 B2 | 12/2014 | Maruyama |
| 9,709,957 B1 | 7/2017 | Kuo et al. |
| 9,819,079 B2 | 11/2017 | Yang |
| 10,156,977 B2 | 12/2018 | Kim et al. |
| 2006/0109835 A1 | 5/2006 | Saitoh |
| 2010/0045615 A1* | 2/2010 | Gray .............. G06F 3/0448 345/173 |
| 2011/0051561 A1* | 3/2011 | Fujisawa .............. G04C 9/02 368/47 |
| 2011/0273399 A1* | 11/2011 | Lee .............. G06F 3/0418 345/174 |
| 2012/0120772 A1 | 5/2012 | Fujisawa |
| 2013/0300678 A1* | 11/2013 | Kang .............. G06F 3/0446 345/173 |
| 2014/0015337 A1 | 1/2014 | Takeuchi et al. |
| 2014/0191978 A1* | 7/2014 | Ng .............. G06F 3/0448 345/173 |
| 2015/0363065 A1* | 12/2015 | Kim .............. G06F 3/0416 715/739 |
| 2017/0003660 A1 | 1/2017 | David |
| 2017/0006414 A1 | 1/2017 | Tomassini |
| 2017/0155429 A1 | 6/2017 | Hung et al. |
| 2017/0317405 A1 | 11/2017 | Han et al. |
| 2018/0046283 A1 | 2/2018 | Yoshida et al. |
| 2020/0052385 A1 | 2/2020 | Han et al. |

FOREIGN PATENT DOCUMENTS

| | | |
|---|---|---|
| CN | 102236470 A | 11/2011 |
| CN | 102832440 A | 12/2012 |
| CN | 104767032 A | 7/2015 |
| CN | 105204326 A | 12/2015 |
| CN | 105204726 A | 12/2015 |
| CN | 105939162 A | 9/2016 |
| CN | 106325058 A | 1/2017 |
| EP | 2560304 A2 | 2/2013 |
| EP | 3065304 A1 | 9/2016 |
| EP | 3193283 A1 | 7/2017 |
| JP | 2006-30211 A | 2/2006 |
| WO | 2013165421 A1 | 11/2013 |
| WO | 2015067289 A1 | 5/2015 |
| WO | 2016/185942 A1 | 11/2016 |

\* cited by examiner

WRISTWATCH AND METHOD APPLICABLE TO WRISTWATCH FOR CONTROLLING MAGNITUDE OF SHORT DISTANCE COMMUNICATION SIGNALS

BACKGROUND

1. Field of the Disclosure

The present disclosure relates to a wristwatch, and more particularly to a wristwatch capable of carrying out short distance communication.

2. Description of Related Art

Short distance communication has been widely used in various applications. Radio frequency identification (RFID) and near field communication (NFC) are common short distance communication technologies.

Nowadays, some electronic devices (e.g., smartphones) cooperate with a short distance communication module to carry out short distance communication. However, some devices use a metal case or have inner components. Communication signals are easily interfered. It may have difficulty to carry out the short distance communication.

For example, it is hard to find a traditional wristwatch product having an integrated short distance communication function. The traditional wristwatch uses a case made of a material (e.g., metal) that easily shields short distance communication signals or has disposed an electric motor that easily interferes with the short distance communication signals. This leads to a big problem in carrying out the short distance communication in the traditional wristwatch. There are technical problems to be overcome in this field.

Moreover, current readers on market have different sensing distances. If the short distance communication signals transmitted from a device are too weak in intensity, the reader may not able to read the signals. If the short distance communication signals are too strong in intensity, it may cause a security concern. Compatibility between the readers and the short distance communication signals transmitted from the device is also a technical problem to be overcome in this field.

Therefore, there is a need to provide a solution for solving the problems in conventional arts.

SUMMARY

The present disclosure provides a wristwatch and a method applicable to a wristwatch, for controlling the magnitude of short distance communication signals.

In one aspect, the present disclosure provides a wristwatch, including a housing, a bottom cover, and a top cover, the housing made of a metal material, the top cover made of a non-metal material, the wristwatch further including a short distance communication module disposed inside the housing, configured to carry out short distance communication with an external device, the short distance communication module including a security chip configured to process private information of a user; a coil configured to transmit electromagnetic signals; and an amplifier disposed between the coil and the security chip, configured to increase magnitude of the electromagnetic signals transmitted by the coil to extend signal sensing distance.

In another aspect, the present disclosure provides a wristwatch including a housing, a bottom cover, and a top cover, the housing made of a metal material, the top cover made of a non-metal material, the wristwatch further including a short distance communication module disposed inside the housing, configured to carry out short distance communication with an external device, the short distance communication module including a security chip configured to process private information of a user; and a coil configured to transmit electromagnetic signals, the wristwatch further including at least a magnetic isolation layer disposed inside the housing and surrounding an inner face of the housing, the magnetic isolation layer having at least a notch that is deployed along a specific direction with respect to the housing.

In still another aspect, the present disclosure provides a method applicable to a wristwatch for controlling magnitude of short distance communication signals, the wristwatch including a housing, a bottom cover, and a top cover, the method including disposing a security chip and a coil inside the housing and using the security chip to interpret electromagnetic signals transmitted by the coil to carry out short distance communication with an external device; and disposing an amplifier between the coil and the security chip and using the amplifier to increase magnitude of the electromagnetic signals transmitted by the coil to extend signal sensing distance.

In still another aspect, the present disclosure provides a method applicable to a wristwatch for controlling magnitude of short distance communication signals, the wristwatch including a housing, a bottom cover, and a top cover, the method including disposing a security chip and a coil inside the housing and using the security chip to interpret electromagnetic signals transmitted by the coil to carry out short distance communication with an external device; providing a plurality of combinations in deploying a magnetic isolation layer, in which the combinations are different in a number, a shape, and/or arrangement of parts of the magnetic isolation layer; disposing the magnetic isolation layer inside the housing and surrounding an inner face of the housing for each type of the combinations, and measuring corresponding intensity distribution of the short distance communication signals; and determining an elected intensity distribution from all of the measured intensity distribution and a combination of the magnetic isolation layer corresponding to the elected intensity distribution.

In the present disclosure, a short distance communication module is disposed inside the wristwatch, and therefore short distance communication is carried out in the wristwatch. Also, by deploying an amplifier in the wristwatch, the magnitude of short distance communication signals can be enhanced. In some embodiments, the magnitude of the short distance communication signals can also increase or decrease through user operations. In another aspect, a magnetic field isolating layer is disposed inside a housing of the wristwatch. This can reduce interference caused by the housing or other components of the wristwatch, and thus can enhance the magnitude of the short distance communication signals and extend the sensing distance.

DETAILED DESCRIPTION OF PREFERRED EMBODIMENTS

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure, and as used herein, the term "embodiment" refers to an instance, an example, or an illustration but is not intended to limit the present disclosure. In addition, the articles "a" and "an" as used in the specification and the appended claims should generally be construed to mean "one or more" unless specified otherwise or clear from the context to be directed to a singular form.

The present disclosure provides a wristwatch having a short distance communication module disposed therein. The wristwatch can communicate with other electronic devices using short distance communication technologies. The short distance communication module may include a radio frequency identification (RFID) module or a near field communication (NFC) module, but is not limited thereto.

Figure 1:
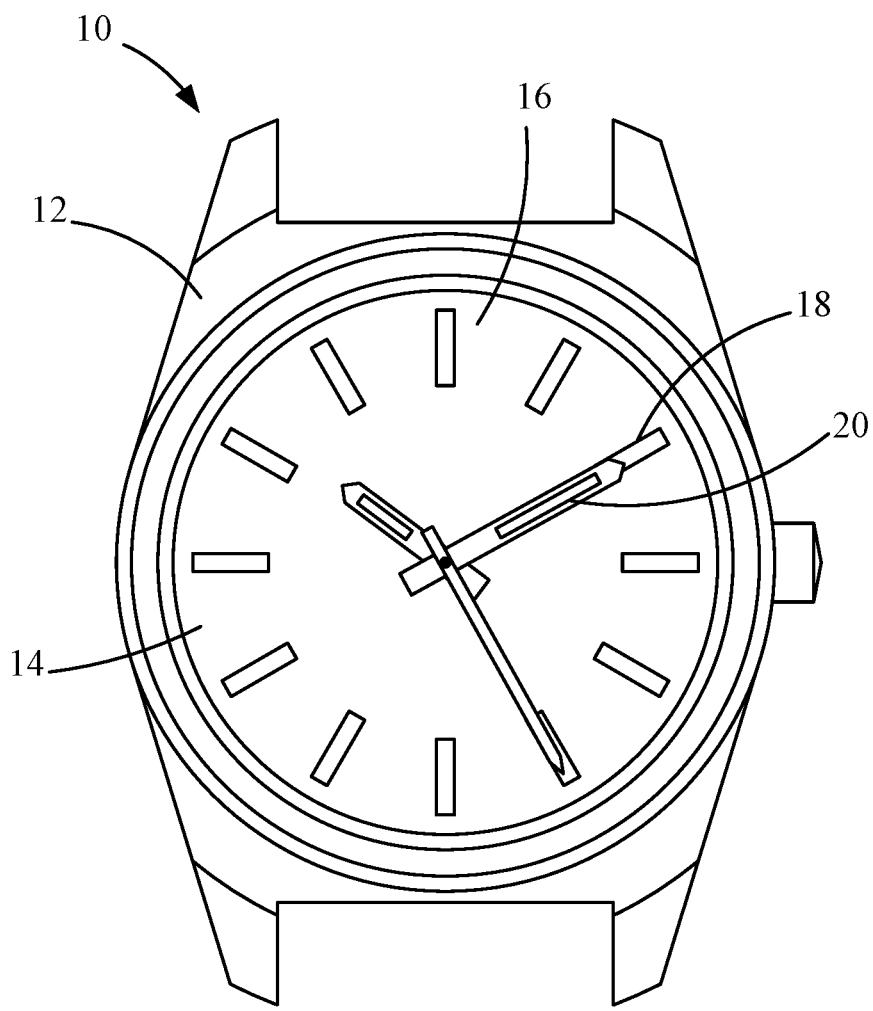
FIG. 1 is a top view of a wristwatch in accordance with an embodiment of the present disclosure.
Figure 2:
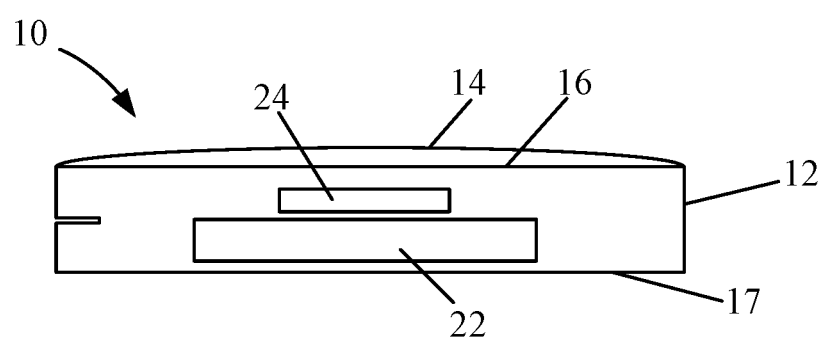
FIG. 2 is a lateral view of the wristwatch in accordance with the embodiment of the present disclosure.

FIG. 1 is a top view of a wristwatch in accordance with an embodiment of the present disclosure. FIG. 2 is a lateral view of the wristwatch in accordance with the embodiment of the present disclosure. As shown in FIG. 1 and FIG. 2, the wristwatch 10 includes a housing 12, a top cover 14, a dial 16, a bottom cover 17, physical scales 18 on a face of the dial 16, and physical indicators 20 disposed above the dial 16 and cooperating with the physical scales 18 to show the time. A receiving room is defined by the housing 12, the top cover 14, and the bottom cover 17. The wristwatch 10 further includes a movement 22 and a short distance communication module 24 that are disposed in the receiving room.

For example, the physical indicators 20 may include an hour hand, a minute hand, and a second hand, or other indicators for specific use. The movement 20 is used to drive the physical indicators 20 to cooperate with the physical scales 18 on the dial 16 to show time information, for example. The top cover 14 is transparent. Through the transparent top cover 14, a user can perceive the position information (i.e., the time information) indicated by the physical indicators 20.

Preferably, the housing 12 is made of a metal material and the top cover 14 and the dial 16 are made of non-metal materials. For example, the dial 16 is plastic and the top cover 14 is made of a transparent plastic or glass material. Such a choice of material highlights how the present disclosure can overcome shielding or interference caused to short distance communication signals. However, this is not the only one choice. In principle, the concept of the present disclosure is applicable as long as one part of an outer case of the wristwatch 10 is not made of a metal material or a material that will shield or absorb the short distance communication signals. Preferably, the housing 12 and the bottom cover 17 are metal and the top cover 14 and the dial 16 are made of non-metal materials.

Figure 3A:
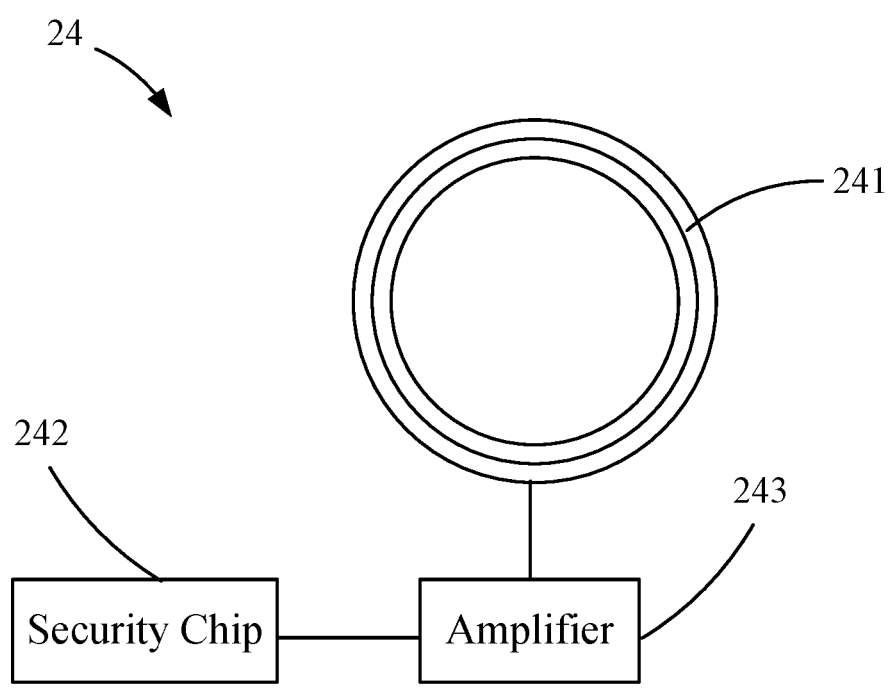
FIG. 3A is a schematic diagram showing a short distance communication module of a wristwatch in accordance with an embodiment of the present disclosure.

FIG. 3A is a schematic diagram showing a short distance communication module of a wristwatch in accordance with an embodiment of the present disclosure. The short distance communication module 24 includes a coil 241 and a security chip 242. The coil 241 is configured to transmit electromagnetic signals. The security chip 242 is configured to process private information of a user. Specifically, when the security chip 242 is to transmit signals to an external device, the coil 241 is applied with an electric current varying with time to generate electromagnetic signals. Alternatively, when the external device is to transmit signals to the security chip 242, the coil 241 generates an electric current varying with time due to external electromagnetic signals and accordingly, the security chip 242 can receive the signals transmitted by the external device. That is, the short distance communication module 24 of the wristwatch 10 communicates with external electronic devices by transmitting the electromagnetic signals (i.e., the short distance communication signals).

In the context, the aforesaid "transmitting" can be referred to a pure "sending" action or a pure "receiving" action, but it can also be referred to "transceiving" (i.e., including sending and receiving actions).

In one embodiment, the short distance communication module 24 includes an amplifier 243 disposed between the coil 241 and the security chip 242. The amplifier 243 is configured to increase magnitude of the electromagnetic signals transmitted by the coil 241 to extend signal sensing distance. Specifically, when the security chip 242 is to send the electromagnetic signals using the coil 241, the electric current to be applied to the coil 241 by the security chip 242 is amplified by the amplifier 243. Alternatively, when the security chip 242 is to receive the electromagnetic signals using the coil 241, the electric current generated by the coil 241 is amplified by the amplifier 243 and then delivered to the security chip 242.

In such a way, the magnitude of the electromagnetic signals transmitted by the coil 241 is enhanced by the amplifier 243. Accordingly, this can overcome the problem of attenuation of the short distance communication signals that interfered with inner components (e.g., an electric motor) of the wristwatch 10 or are shielded by the metal housing 12 of the wristwatch 10.

Figure 3B:
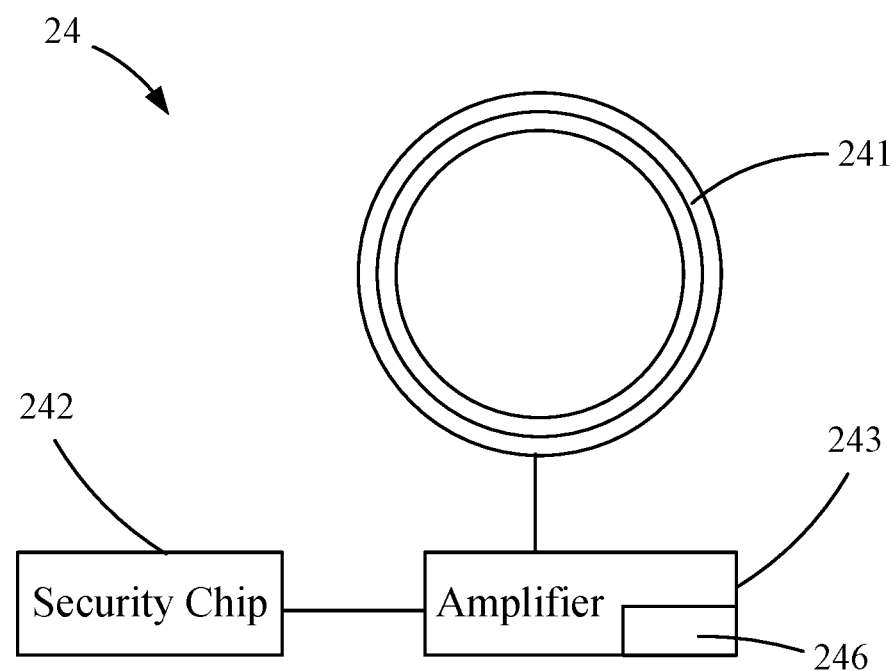
FIG. 3B is a schematic diagram showing a short distance communication module of a wristwatch in accordance with another embodiment of the present disclosure.

FIG. 3B is a schematic diagram showing a short distance communication module of a wristwatch in accordance with another embodiment of the present disclosure. In this embodiment, the amplifier 243 includes a processor 246. The processor 246 can be used to determine sensitivity of the amplifier 243 in adjusting its gain. For instance, the gain of the amplifier 243 is adjustable (which will be described in more detail below). The amplifier 243 can increase or decrease the magnitude of the electromagnetic signals. The processor 246 can determine the magnitude each time the user adjusts.

Figure 4:
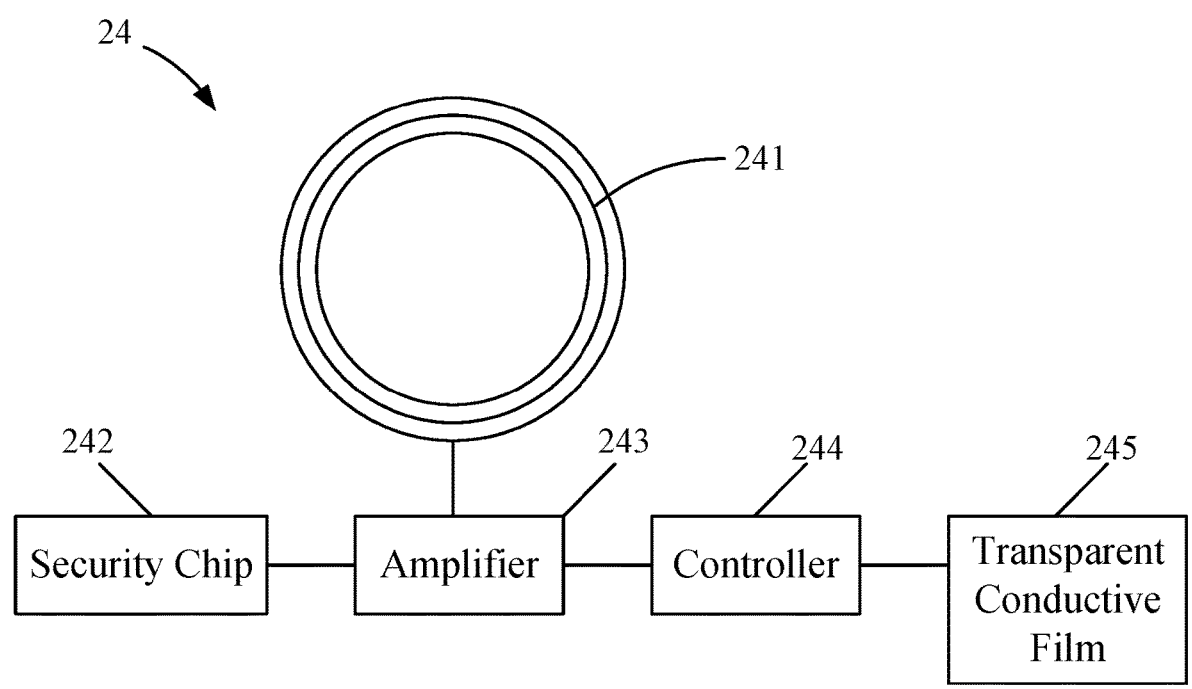
FIG. 4 is a schematic diagram showing a short distance communication module of a wristwatch in accordance with another embodiment of the present disclosure.
Figure 5:
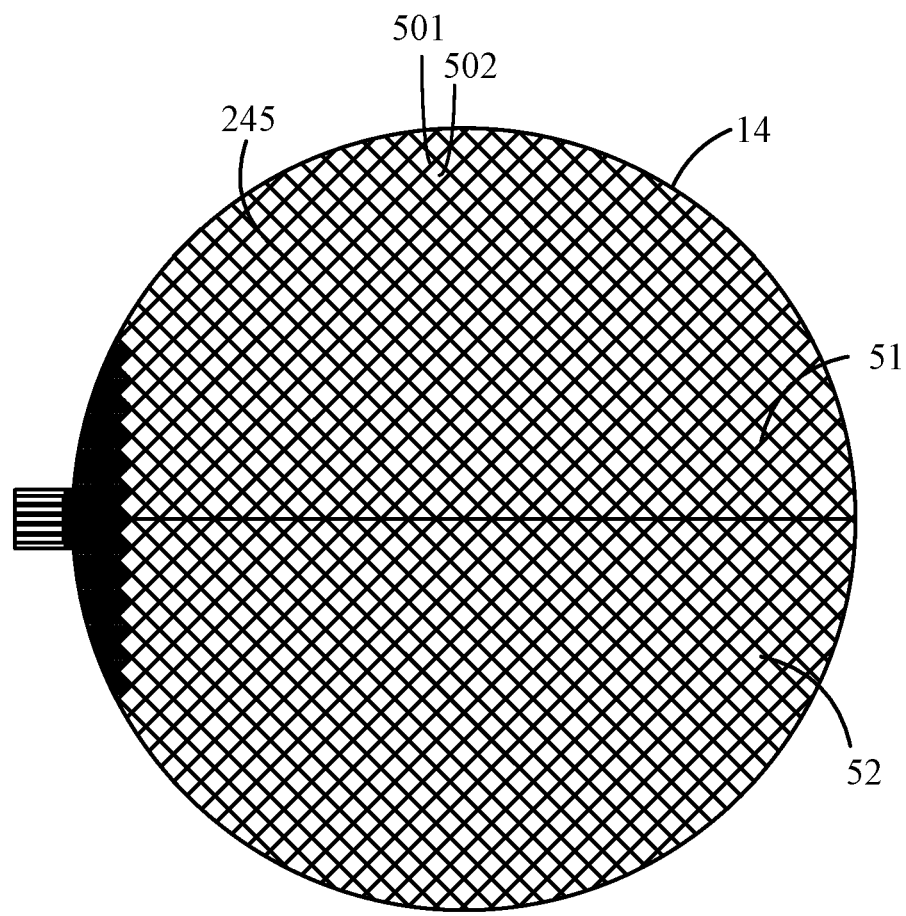
FIG. 5 is a schematic diagram showing a transparent conductive film of a wristwatch in accordance with an embodiment of the present disclosure.

FIG. 4 is a schematic diagram showing a short distance communication module of a wristwatch in accordance with another embodiment of the present disclosure. FIG. 5 is a schematic diagram showing a transparent conductive film of a wristwatch in accordance with an embodiment of the present disclosure. In an embodiment, referring to FIG. 4 and FIG. 5, the magnitude of the electromagnetic signals transmitted by the coil 241 can be enhanced or lowered by adjusting the gain of the amplifier 243. As shown in FIG. 4, the short distance communication module 24 further includes a controller 244 and a transparent conductive film 245. The transparent conductive film 245 is disposed on the top cover 14 and is configured to receive a user operation and generate a detecting signal correspondingly. The controller 244 is coupled to the transparent conductive film 245 and the amplifier 243 and is configured to receive the detecting signal and determine the gain of the amplifier 243. Based on the gain determined by the controller 244, the amplifier 243 adjusts (i.e., increases or decreases) the magnitude of the electromagnetic signals transmitted by the coil 241.

As shown in FIG. 5, the transparent conductive film 245 is a conductive film formed in a mesh shape. In practice, the mesh shape is formed by a plurality of ultra-fine metal lines. Accordingly, when the transparent conductive film 245 is deployed on the top cover 14, the user still can perceive the position indicated by the physical indicators 20. The transparent conductive film 245 is divided into a first area 51 and a second area 52 that are electrically disconnected from each other. For example, the first area 51 corresponds to the top half of the top cover 14 and the second area 52 corresponds to the bottom half of the top cover 14. Each of the first area 51 and the second area 52 of the transparent conductive film 245 includes a plurality of conductive wires 501 that are interlaced with each other to construct a plurality of conductive units 502. An integral effect of electrical signal changes (e.g., voltage or current signal changes) of all the conductive units 502 in each area is generated by an approximal action or a touch action performed above or onto the area. That is, the detecting signal can be represented by the integral effect of the electrical signal changes. The first area 51 and the second area 52 are connected to the controller 244 individually. The controller 244 can identify which area (the first area 51 or the second area 52) generates the detecting signal.

It can be understood by a person skilled in the art that using the transparent conductive film 245 to detect user operations as described above is apparently different from touch operation sensing technologies used in conventional touch panels and image display technologies with pixel electrodes used in conventional display panels.

In one application scenario, the user long presses the top half (i.e., the first area 51) of the top cover 14 to activate the short distance communication module 24 to start the short distance communication, and the user long presses the bottom half (the second area 52) of top cover 14 to deactivate the short distance communication module 24 to stop the short distance communication. When the short distance communication is started, the user presses the top half of top cover 14 to increase the gain of the amplifier 243 to enhance the magnitude of the electromagnetic signals transmitted by the coil 241, and the user presses the bottom half of the top cover 14 to decrease the gain of the amplifier 243 to lower the magnitude of the electromagnetic signals transmitted by the coil 241.

In such a way, click operations made by the user onto the top cover 14 of the wristwatch 10 can increase or decrease the magnitude of the short distance communication signals. In a case of insufficient signal strength, this approach can increase the signal strength and solve the problem of compatibility with a reader. In a case that the short distance communication module 24 is already able to communicate with the reader, the user can try to decrease the signal strength to increase communication security and reduce the possibility of skimming or eavesdropping.

Figure 6:
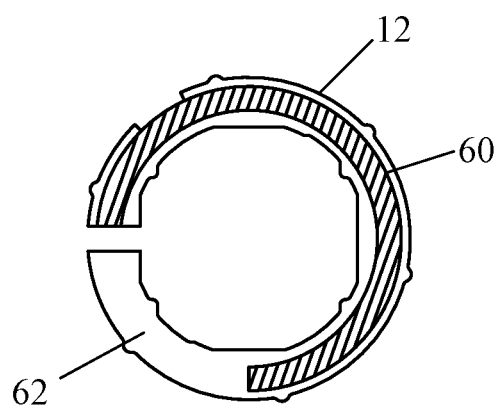
FIG. 6 is a schematic diagram showing a wristwatch in accordance with another embodiment of the present disclosure.

FIG. 6 is a schematic diagram showing a wristwatch in accordance with another embodiment of the present disclosure. In this embodiment, in order to reduce the effect of the housing (made of a metal material, for example) 12 on the short distance communication module 24, the wristwatch 10 of the present embodiment includes a magnetic isolation layer 60 such as a magnetic guiding plate. The magnetic isolation layer 60 is configured to guide the electromagnetic signals or partially absorb the electromagnetic signals to achieve effect of suppressing electromagnetic wave interference. The magnetic isolation layer 60 is disposed inside the housing 12 and surrounding an inner face of the housing 12. The magnetic isolation layer 60 has at least a notch 62 that is deployed along a specific direction with respect to the housing 12. The number of the notches is not limited. It may have two or more than two notches that are deployed along their own specific directions.

The short distance communication signals may have different intensity distribution for different types of wristwatch products. The intensity distribution may be effected by electrically driving components (e.g., an electric motor) of the wristwatch and/or entire structural deployment of the wristwatch. In the embodiment of the present disclosure, a trial-and-error approach can be used to find the best orientation of the notch 62 of the magnetic isolation layer 60 such that the short distance communication signals measured from outside have the highest strength. By this way, the magnitude of the short distance communication signals can be enhanced and this increases the sensing distance, and accordingly, the wristwatch can carry out the short distance communication.

In one embodiment, on a basis of the embodiment having the amplifier 243, the aforesaid magnetic isolation layer 60 can be further added to better carry out enhancing the magnitude of the short distance communication signals. In another embodiment, on a basis of the embodiment having the amplifier 243 and the transparent conductive film 245, the aforesaid magnetic isolation layer 60 can be further added to better carry out adjusting the magnitude of the short distance communication signals.

Figure 7:
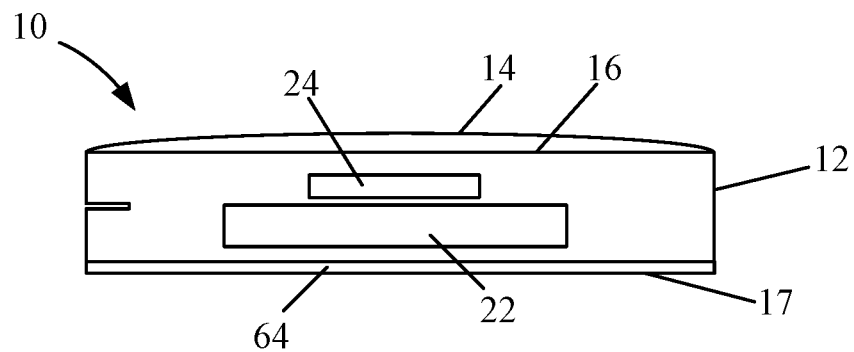
FIG. 7 is a schematic diagram showing a wristwatch in accordance with another embodiment of the present disclosure.

FIG. 7 is a schematic diagram showing a wristwatch in accordance with another embodiment of the present disclosure. In this embodiment, the bottom cover 17 is made of metal. A magnetic isolation layer 64 is attached to an inner face of the bottom cover 17. The magnetic isolation layer 64 is disposed on the inner face of the bottom cover 17 facing the top cover 14.

The magnetic isolation layer 64 at an inner side of the bottom cover 17 is disposed substantially corresponding to a size and a shape of the bottom cover 17.

In one embodiment, both of the magnetic isolation layer 60 attached to the housing 12 and the magnetic isolation layer 64 attached to the bottom cover 17 are deployed. This can better achieve effect of suppressing electromagnetic wave interference such that the short distance communication can be carried out.

Figure 8:
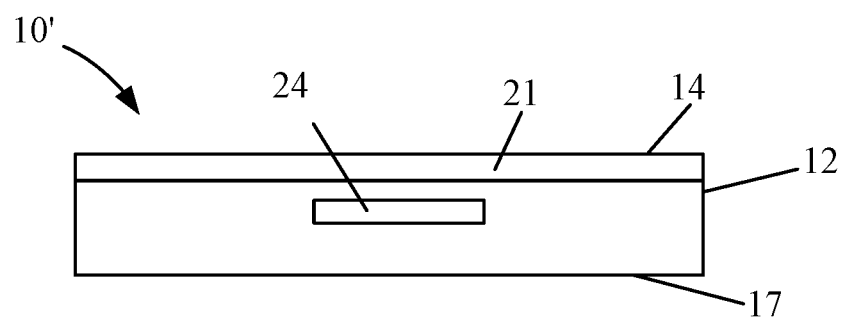
FIG. 8 is a schematic diagram showing a wristwatch in accordance with another embodiment of the present disclosure.

The concept of the present disclosure is not limited to the wristwatch having the physical indicators (e.g., physical hour, minute, and second hands) as described above, but also applicable to a wristwatch having a display (e.g., a liquid crystal display and an organic light emitting diode display) used to show the time. As shown in FIG. 8, the wristwatch 10' includes a housing 12, a bottom cover 17, and a top cover 14. The wristwatch 10' further includes a touch screen display device 21 and a short distance communication module 24. The top cover 14 is a part of the touch screen display device 21. The touch screen display device 21 can show time information. The short distance communication module 24 is disposed in a receiving room defined by the housing 12, the bottom cover 17, and the top cover 14. Based on the concept of the present disclosure, the wristwatch 10' can have the aforesaid amplifier and can also have the magnetic isolation layer disposed on an inner face of the housing 12 and/or the bottom cover 17.

Figure 9:
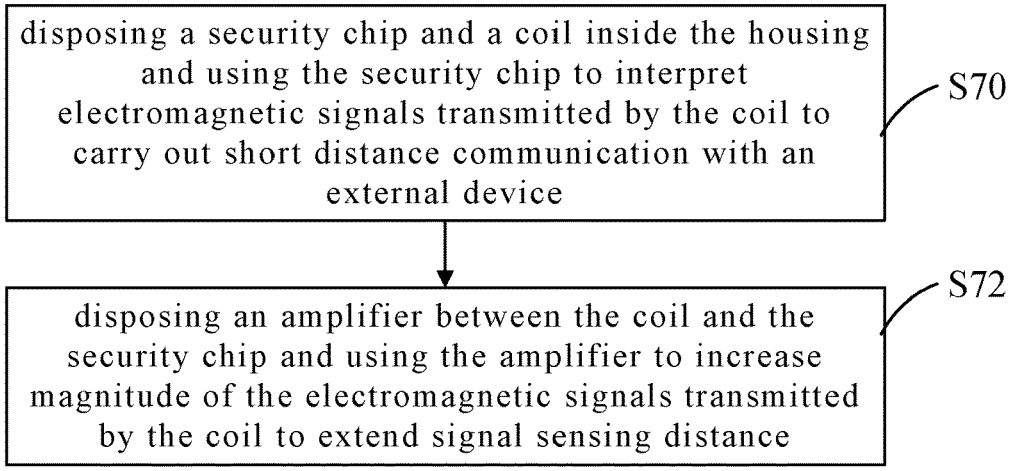
FIG. 9 is a flowchart of a method applicable to a wristwatch for controlling the magnitude of short distance communication signals in accordance with an embodiment of the present disclosure.

FIG. 9 is a flowchart of a method applicable to a wristwatch for controlling the magnitude of short distance communication signals in accordance with an embodiment of the present disclosure. Referring to FIG. 9 with reference to the above context, the method includes the following steps.

In Step S70, a security chip 242 and a coil 241 are disposed inside the housing 12 and the security chip 242 is used to interpret electromagnetic signals transmitted by the coil 241 to carry out short distance communication with an external device.

In Step S72, an amplifier 243 is disposed between the coil 241 and the security chip 242 and the amplifier 243 is used to increase the magnitude of the electromagnetic signals transmitted by the coil 241 to extend signal sensing distance.

In this method, a short distance communication module 24 (including the coil 241 and the security chip 242) is deployed inside the wristwatch and the amplifier 243 is used to enhance the magnitude of the short distance communication signals to increase signal strength. This makes the short distance communication able to be carried out in wristwatch products.

The embodiment shown in FIG. 9 is applicable to a wristwatch 10 having physical indicators and is also applicable to a wristwatch 10' having a touch screen display device 21 used to show the time.

Figure 10:
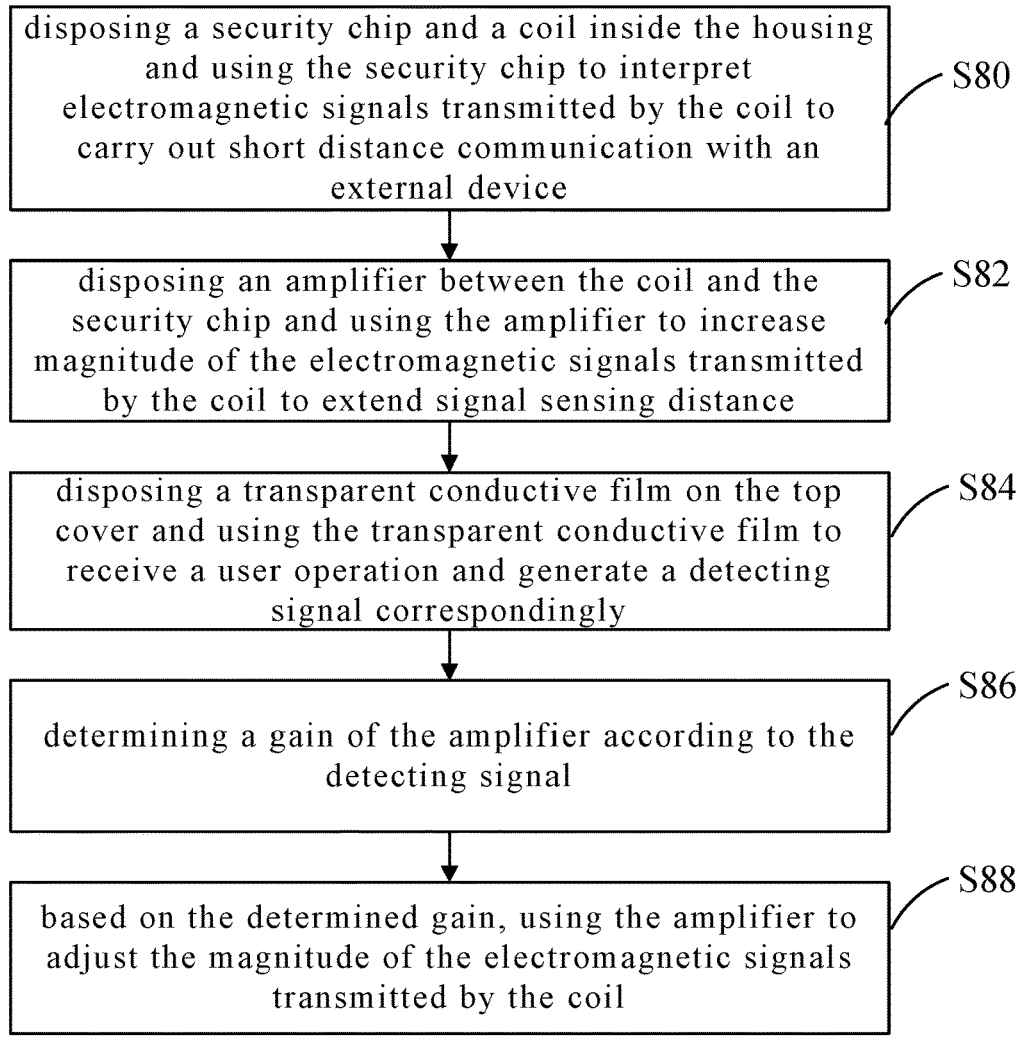
FIG. 10 is a flowchart of a method applicable to a wristwatch for controlling the magnitude of short distance communication signals in accordance with another embodiment of the present disclosure.

FIG. 10 is a flowchart of a method applicable to a wristwatch for controlling the magnitude of short distance communication signals in accordance with another embodiment of the present disclosure. Referring to FIG. 10 with reference to the above context, the method includes the following steps.

In Step S80, a security chip 242 and a coil 241 are disposed inside the housing 12 and the security chip 242 is used to interpret electromagnetic signals transmitted by the coil 241 to carry out short distance communication with an external device.

In Step S82, an amplifier 243 is disposed between the coil 241 and the security chip 242 and the amplifier 243 is used to increase the magnitude of the electromagnetic signals transmitted by the coil 241 to extend signal sensing distance.

Steps S80 and S82 correspond to Steps S70 and S72 and are not repeated herein.

In Step 84, a transparent conductive film 245 is disposed on the top cover 14 and the transparent conductive film 245 is used to receive a user operation and generate a detecting signal correspondingly.

In Step S86, a gain of the amplifier 243 is determined according to the detecting signal. In this step, the controller 244 receives the detecting signal and determine the gain of the amplifier 243 according to the detecting signal.

In Step S88, based on the determined gain, the amplifier 243 is used to adjust the magnitude of the electromagnetic signals transmitted by the coil 241. In this step, based on the gain determined by the controller 244, the amplifier 243 adjusts (i.e., increases or decreases) the magnitude of the electromagnetic signals transmitted by the coil 241.

In this method, the transparent conductive film 245 can be further divided into a first area 51 and a second area 52 that are electrically disconnected from each other. Based on operations made by a user onto the first area 51 or the second area 52, the magnitude of the short distance communication signals can be enhanced or lowered. The method may further include the following steps:

a. dividing the transparent conductive film 245 into a first area 51 and a second area 52 that are electrically disconnected from each other;
b. receiving an operation made by a user onto the first area 51 to generate a first sensing signal and based on the first sensing signal, increasing the magnitude of the electromagnetic signals transmitted by the coil 241; and
c. receiving an operation made by the user onto the second area 52 to generate a second sensing signal and based on the second sensing signal, decreasing the magnitude of the electromagnetic signals transmitted by the coil 241.

Figure 11:
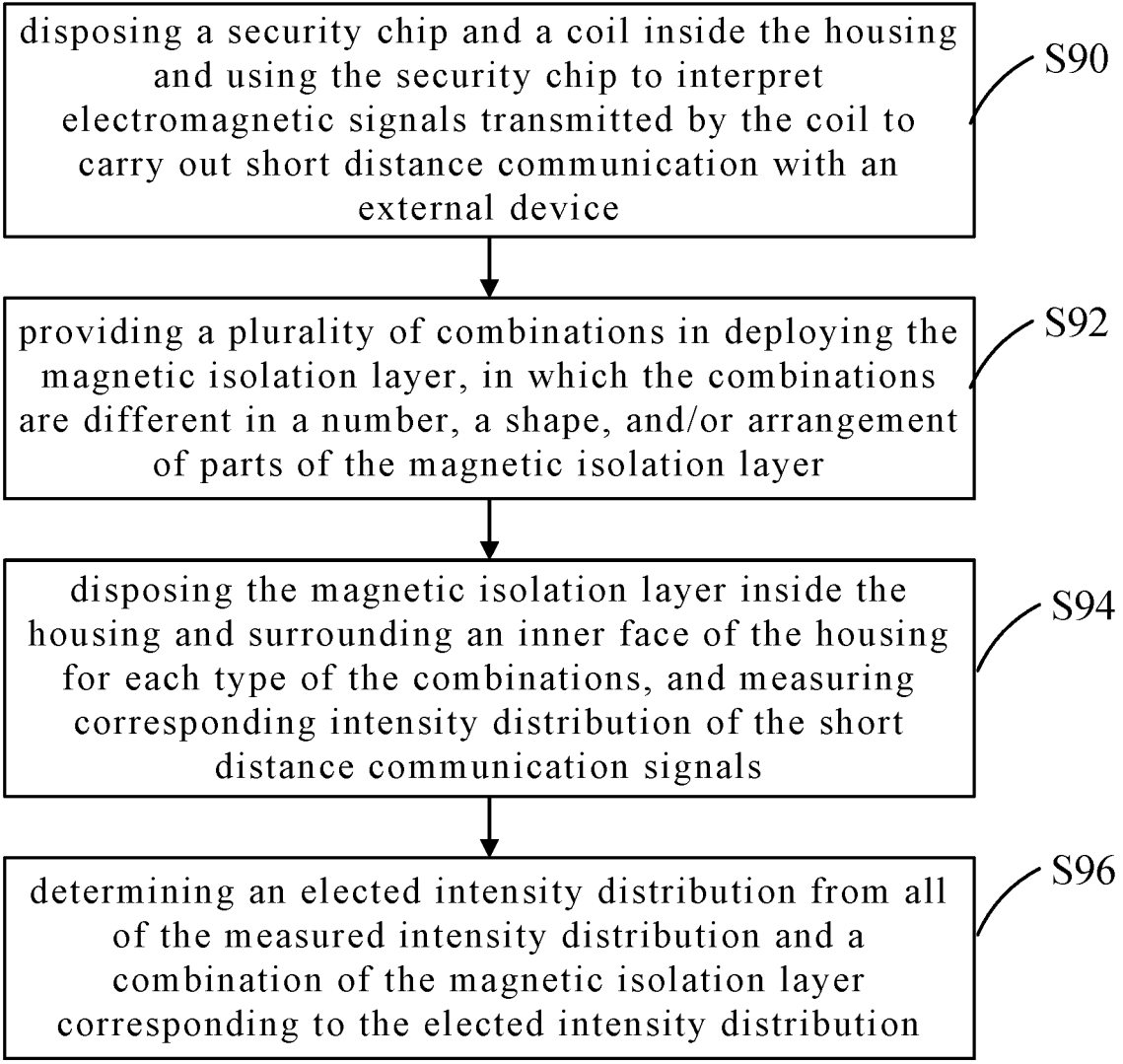
FIG. 11 is a flowchart of a method applicable to a wristwatch for controlling the magnitude of short distance communication signals in accordance with another embodiment of the present disclosure.

FIG. 11 is a flowchart of a method applicable to a wristwatch for controlling the magnitude of short distance communication signals in accordance with another embodiment of the present disclosure. Referring to FIG. 11 with reference to the above context, the method includes the following steps.

In Step S90, a security chip 242 and a coil 241 are disposed inside the housing 12 and the security chip 242 is used to interpret electromagnetic signals transmitted by the coil 241 to carry out short distance communication with an external device.

Step S90 corresponds to Step S70 or S80 and is not repeated herein.

Figure 12A:
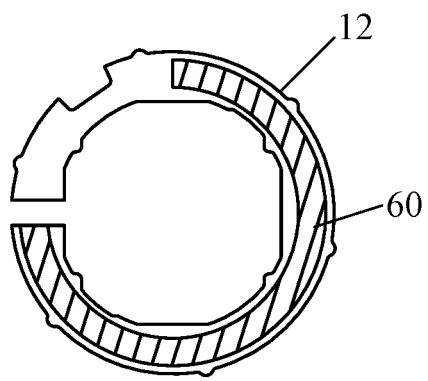
FIG. 12A, FIG. 12B, and FIG. 12C are schematic diagrams showing various types of magnetic isolation layers in accordance with embodiments of the present disclosure.
Figure 12B:
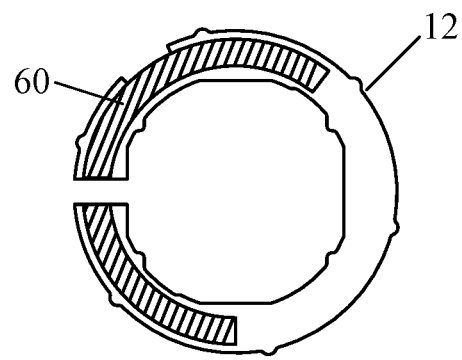
Figure 12C:
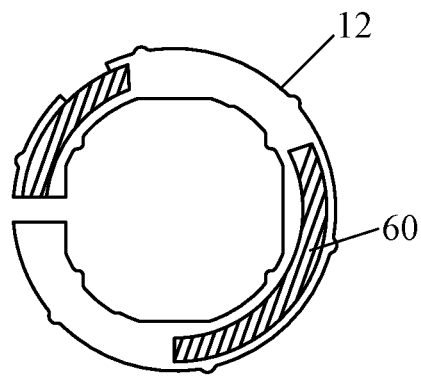

In Step S92, a plurality of combinations are provided in deploying a magnetic isolation layer 60. The combinations are different in a number, a shape, and/or arrangement of parts of the magnetic isolation layer 60. As described above, the magnetic isolation layer 60 is configured to guide or partially absorb electromagnetic signals to achieve effect of suppressing electromagnetic wave interference. In this step, lots of types of combinations for constructing the magnetic isolation layer 60 are provided. These combinations are exemplarily shown in FIGS. 12A to 12C. These combinations may be established by considering some factors such as the material or shape of the magnetic isolation layer, the number or arrangement of parts of the magnetic isolation layer, or the number or orientation of formed notches of the magnetic isolation layer.

In Step S94, the magnetic isolation layer is disposed inside the housing 12 and surrounding an inner face of the housing 12 for each type of the combinations, and corresponding intensity distribution of the short distance communication signals is measured. In order to know to what a degree the magnitude of the short distance communication signals is enhanced, different combinations are tried and signal intensity distribution is measure outside the wristwatch.

In Step S96, an elected intensity distribution is determined from all of the measured intensity distribution and a combination of the magnetic isolation layer corresponding to the elected intensity distribution is determined. In this step, from the measured data, it can be determined a better or an intensive signal distribution, which serves the elected intensity distribution. A combination corresponding to the elected intensity distribution is obtained accordingly. That is, based on the determined combination, a corresponding magnetic isolation layer is deployed in a wristwatch of a certain type such that enhancement of the magnitude of the short distance communication signals is optimized for this type of wristwatches. The sensing distance is extended accordingly.

This method locates the combination that can optimize the enhancement of the magnitude of the short distance communication signals such that short distance communication can be carried out in wristwatches.

The embodiment shown in FIG. 11 is applicable to a wristwatch 10 having physical indicators and is also applicable to a wristwatch 10' having a touch screen display device 21 used to show the time.

The afore-described method using the magnetic isolation layer to increase the magnitude of the short distance communication signals may cooperate with the method shown in FIG. 10 to further increase the signal intensity, and may also cooperate with the method shown in FIG. 9 to carry out adjusting the signal intensity.

While the preferred embodiments of the present disclosure have been illustrated and described in detail, various modifications and alterations can be made by persons skilled in this art. The embodiment of the present disclosure is therefore described in an illustrative but not restrictive sense. It is intended that the present disclosure should not be limited to the particular forms as illustrated, and that all modifications and alterations which maintain the spirit and realm of the present disclosure are within the scope as defined in the appended claims.

The invention claimed is:

1. A wristwatch, comprising a housing, a bottom cover, and a top cover, the housing made of a metal material, the top cover made of a non-metal material, the wristwatch further comprising:
   a short distance communication module disposed inside the housing, configured to carry out short distance communication with an external device, the short distance communication module comprising:
   a security chip configured to process private information of a user;
   a coil configured to transmit electromagnetic signals;
   an amplifier disposed between the coil and the security chip, configured to increase magnitude of the electromagnetic signals transmitted by the coil to extend signal sensing distance;
   a transparent conductive film disposed on the top cover, configured to receive a user operation and generate a detecting signal correspondingly, wherein the transparent conductive film comprises a plurality of conductive wires that are interlaced with each other to construct a plurality of conductive units, and the detecting signal corresponds to an integral effect of electrical signal changes of all of the conductive units; and
   a controller coupled to the transparent conductive film and the amplifier, configured to receive the detecting signal and determine a gain of the amplifier according to the detecting signal, wherein based on the gain determined by the controller, the amplifier adjusts the magnitude of the electromagnetic signals transmitted by the coil to adjust the signal sensing distance,
   wherein the transparent conductive film is divided into a first area and a second area that are electrically disconnected from each other;
   wherein the first area generates a first sensing signal in response to the user operation, and the controller increase the gain of the amplifier according to the first sensing signal to increase the magnitude of the electromagnetic signals transmitted by the coil; and
   wherein the second area generates a second sensing signal in response to the user operation, and the controller decrease the gain of the amplifier according to the second sensing signal to decrease the magnitude of the electromagnetic signals transmitted by the coil.

2. The wristwatch according to claim 1, wherein the amplifier comprises a processor configured to determine sensitivity of the amplifier in adjusting the gain.

3. The wristwatch according to claim 1, wherein the bottom cover is made of metal, a magnetic isolation layer is attached to an inner face of the bottom cover, and a size and a shape of the magnetic isolation layer correspond to the bottom cover.

4. The wristwatch according to claim 1, further comprising a dial made of a non-metal material, physical scales on a face of the dial, and physical indicators disposed above the dial and cooperating with the physical scales to show the time.

5. The wristwatch according to claim 1, further comprising a touch screen display device used to show time information, wherein the top cover is a part of the touch screen display device.

6. A method applicable to a wristwatch for controlling magnitude of short distance communication signals, the wristwatch comprising a housing, a bottom cover, and a top cover, the method comprising:
   using a security chip to interpret electromagnetic signals transmitted by a coil to carry out short distance communication with an external device;
   using an amplifier to increase magnitude of the electromagnetic signals transmitted by the coil to extend signal sensing distance;
   using a transparent conductive film to receive a user operation and generate a detecting signal correspondingly, wherein the transparent conductive film comprises a plurality of conductive wires that are interlaced with each other to construct a plurality of conductive units, and the detecting signal corresponds to an integral effect of electrical signal changes of all of the conductive units;
   determining a gain of the amplifier according to the detecting signal;
   based on the determined gain, using the amplifier to adjust the magnitude of the electromagnetic signals transmitted by the coil;
   receiving the user operation made onto a first area of the transparent conductive film to generate a first sensing signal and based on the first sensing signal, increasing the magnitude of the electromagnetic signals transmitted by the coil; and receiving the user operation made onto a second area to generate a second sensing signal and based on the second sensing signal, decreasing the magnitude of the electromagnetic signals transmitted by the coil, wherein the transparent conductive film is divided into the first area and the second area that are electrically disconnected from each other.

7. The method according to claim 6, wherein the method is applicable to the wristwatch that further comprises a dial, physical scales on a face of the dial, and physical indicators disposed above the dial and cooperating with the physical scales to show the time.

8. The wristwatch according to claim 6, wherein the method is applicable to the wristwatch that further comprises a touch screen display device used to show time information, wherein the top cover is a part of the touch screen display device.

* * * * *